INVENTOR.
ALEXANDER YORINKS
BY Leonard H. King
AGENT

May 27, 1958 A. YORINKS 2,836,469
PROGRESSIVE SLIDE MECHANISM
Filed Jan. 13, 1954 4 Sheets-Sheet 2
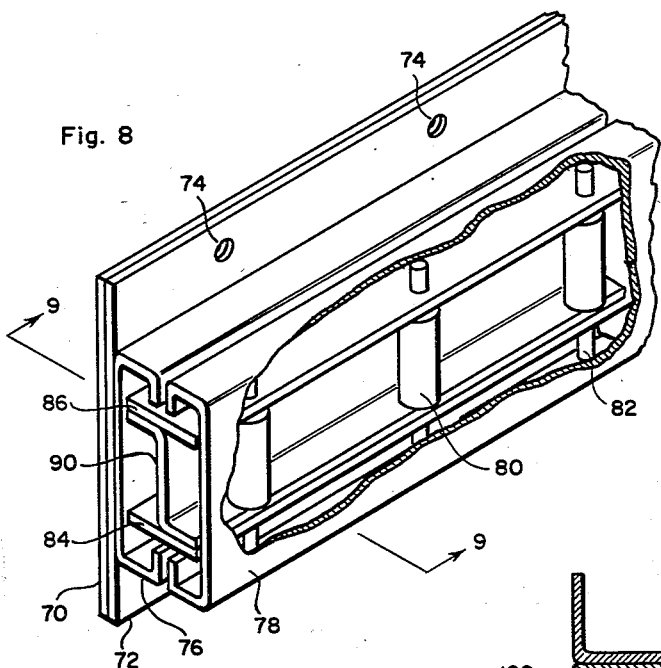
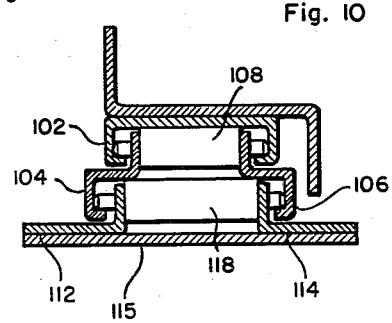
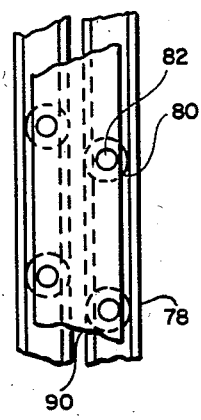
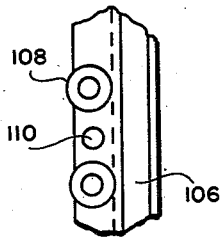
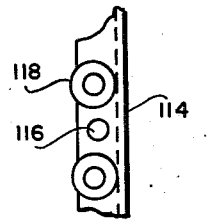
INVENTOR.
ALEXANDER YORINKS
BY Leonard H. King
AGENT

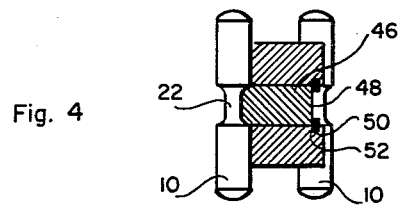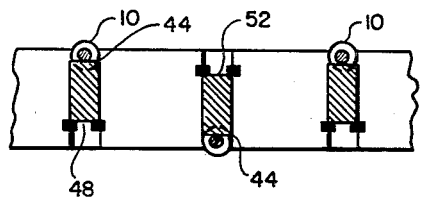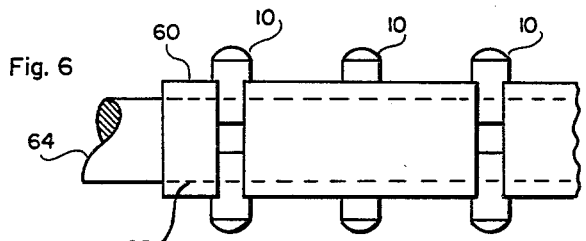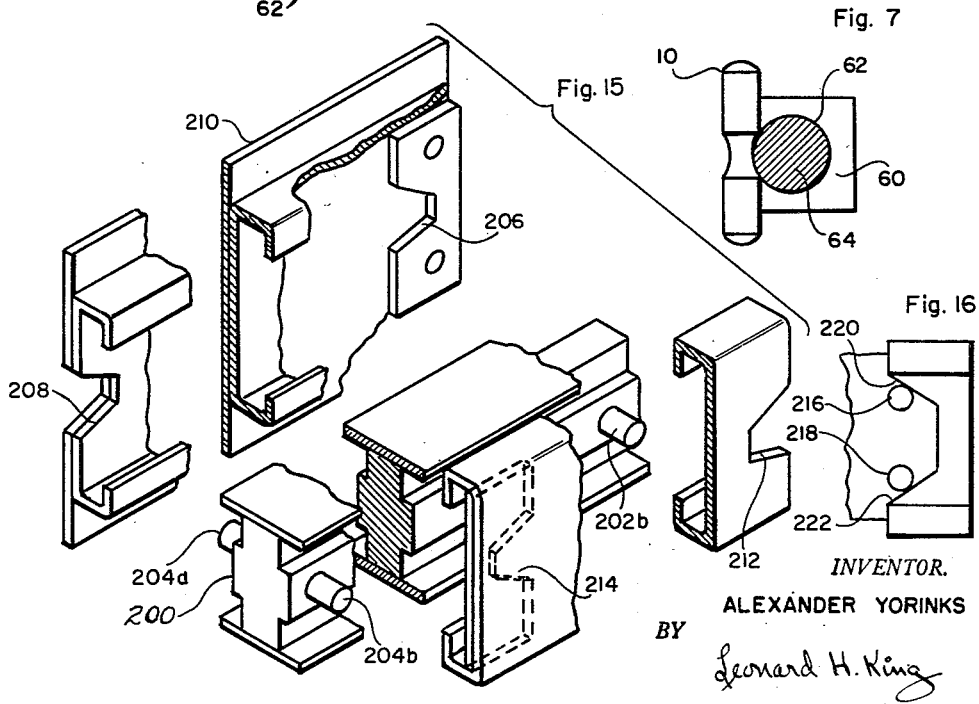

United States Patent Office 2,836,469
Patented May 27, 1958

2,836,469

PROGRESSIVE SLIDE MECHANISM

Alexander Yorinks, New Hyde Park, N. Y.

Application January 13, 1954, Serial No. 403,819

20 Claims. (Cl. 308—3.8)

This invention relates to slide mechanisms for drawers, rack mounted equipment chassis and the like and, in particular, to such mechanisms of the progressive type.

Progressive slide mechanisms capable of supporting heavy loads and which provide easy or low friction operation available prior to this invention have been in general complex mechanisms requiring precision production practices and accordingly, unlike the devices of this invention, are expensive to manufacture.

In certain applications, apparatus such as electronic tubes and related components are mounted on a chassis which is in turn attached to extensible members. While normally it is sufficient to extend the support to provide access to the apparatus for making of adjustments, etc., it is frequently necessary to completely remove the apparatus for maintenance operations or operational reasons. If the slide mechanism is separable without disassembly of the mechanism as is the apparatus of this invention, a convenient means for accomplishing the separation exists.

The devices of this invention satisfy these requirements and many other objects.

This invention also provides a progressive slide mechanism which may be extended to more than twice its closed length and capable of supporting the same load in its extended position as in its closed position.

An object of this invention is to provide a slide mechanism having these advantages which is simple and inexpensive in its parts and which may be easily assembled with low labor cost.

Another object of this invention is to provide an extensible support member which is durable and free from vibration and rattling after extended use.

Another feature of this invention is the provision of a progressive slide mechanism which may be disassembled without disengaging individual bearing members.

Another object of this invention is to provide a progressive slide mechanism using a novel bearing arrangement.

An object of this invention is to provide progressive slide mechanism having an improved locking means.

A still different object of this invention is to provide a slide mechanism utilizing roller pins as bearings.

A particular object of this invention is to provide a slide mechanism capable of supporting a heavy load in an extended position.

Other objects and advantages of this invention will become apparent from the following description taken in conjunction with the accompanying drawings.

Figure 3:
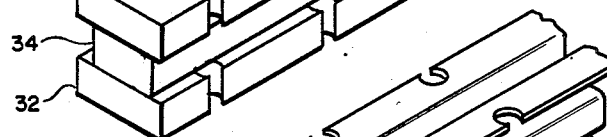

Figure 3 presents, pictorially, another alternative progressive slide intermediate portion.

Figure 4 presents in cross section the plan view of an alternative intermediate member.

Figure 5 shows in elevation a cross section of the ment of Figure 4.

Figure 6 is a plan view of still another intermediate member having a novel roller locking feature.

Figure 7 is a cross-sectional view of the device of Figure 6.

In Figure 8 there is shown, pictorially, a slide mechanism of this invention utilizing an alternative roller pin design.

Figure 9 shows, partially broken away, the embodiment of Figure 8 utilizing an alternative spacer arrangement.

Figure 10 shows, in elevation, a still different roller pin slide mechanism.

Figures 11 and 12 show, in plan, the elements of the mechanism of Figure 10.

Figure 13:
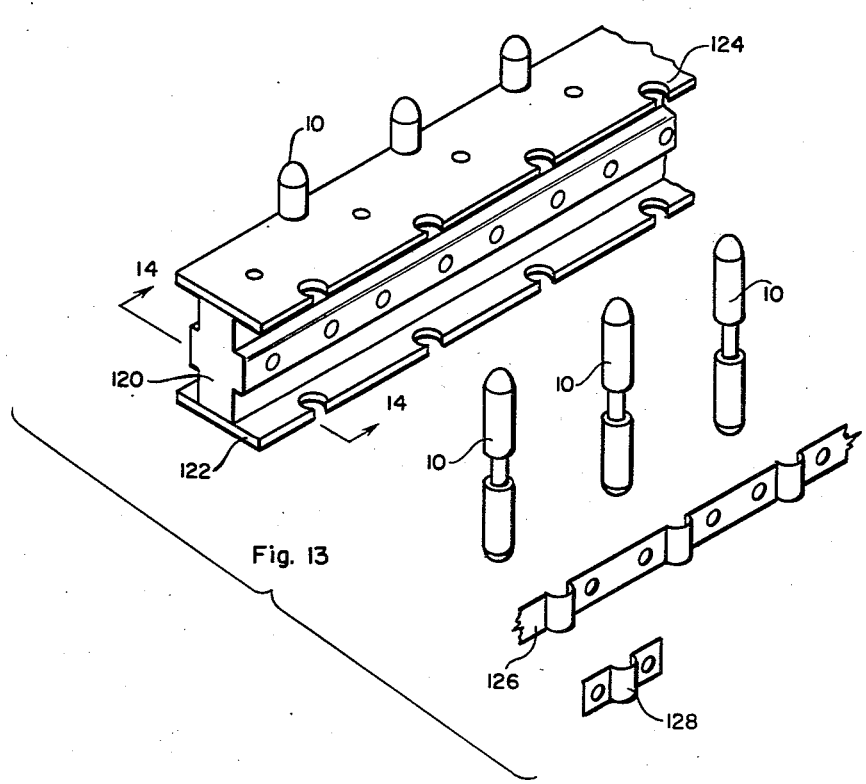

Figure 13 presents, pictorially, still another embodiment of this invention partially disassembled.

Figure 14:
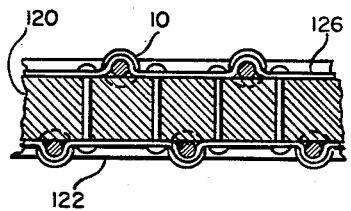

Figure 14 is a cross-sectional view of the assembled unit of Figure 13.

Figure 15 shows isometrically a slide mechanism of this invention incorporating a preferred stop mechanism.

Figure 16 discloses a two pin locking mechanism.

There are three principal members in a progressive slide mechanism. The first, referred to hereafter as the "load member" is normally attached directly to the object to be supported. The second is the "fixed member" which is stationary and is usually attached to the cabinet or console. The third is the "intermediate or progressive member" which is supported by the fixed member and which in turn supports the load member.

Figure 1:
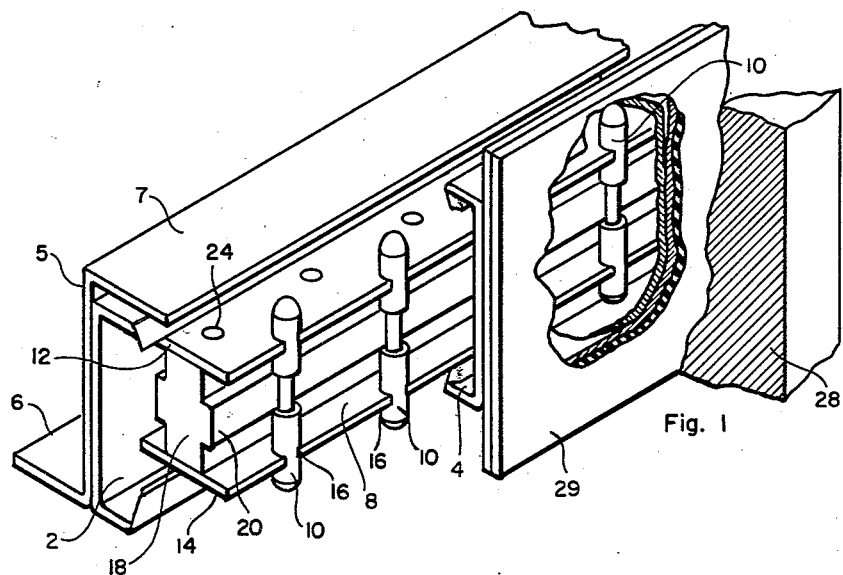
Figure 1 is a preferred embodiment of the slide mechanism of this invention shown in perspective with a portion broken away for purposes of illustration.

There is shown in Figure 1 the currently preferred embodiment of this invention. Two identical simple C-shaped members which may be inexpensively manufactured by conventional sheet metal techniques serve as the load member 2 and fixed member 4.

Mounting member 5 shown attached to load member 2 provides a flange portion 6 and a flange portion 7 which permits two alternative load mounting positions. An intermediate member shown generally at 8 positions a plurality of roller pins 10. The intermediate member consists of flat metal plates 12 and 14 which positions the roller pins 10 relative to each other by means of partial holes 16 so that a portion of each roller pin 10 is exposed to provide a bearing surface. Plates 12 and 14 are spaced by center web member 18 which has a protruding rib 20 adapted to mate with annular recess 22 of pin 10 so as to lockingly restrain the pins 10 into the intermediate member. Rivets 24 extend through plates 12, web member 18, and plate 14 to secure these elements together.

Assume that a chassis attached to mounting member 5 is to be withdrawn from a cabinet 26 in which the slide mechanism is mounted. Load member 2 is caused to slide outwardly carrying with it intermediate member 8. Conventional stop mechanisms, not shown, limit the total extension and thus prevent separation of the various members. By releasing of the stop mechanism the load member 2 may be removed so that components mounted on the chassis may be serviced or optionally the whole chassis may be replaced including the load member 2, since the load members are inherently interchangeable.

An important advantage of the slide mechanism of this invention is the retention of the bearing members, roller pins 10, in the intermediate member when the slide is disassembled.

In conventional units using ball bearings either the balls are individually mounted in the apparatus or as many as four separate ball retainers are employed. Either construction is undesirable. The use of balls without a retainer is impractical with respect to field separation of the members.

A preferred method of mounting the fixed member to the cabinet is by means of bolts with a shock absorbing member in the form of resilient rubber sheet 29, compressed between the fixed member 4 and cabinet 28. The wall of fixed member 4 is bonded to rubber sheet 29. This method of mounting provides a shock absorbing structure. Alternatively, the fixed member may be welded or bolted directly to the cabinet.

Figure 2:
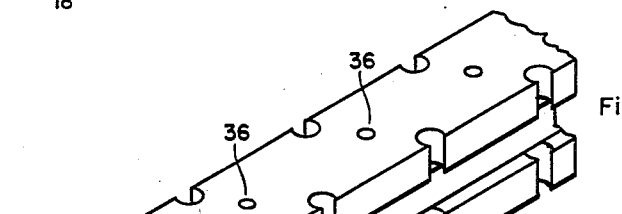
Figure 2 is a perspective view of an alternative intermediate member.

Alternative constructions of the intermediate member are shown in Figures 2 and 9.

In Figure 2 three flat members are shown assembled to form the top and bottom retaining plates, 30 and 32, of the intermediate member while member 34 forms the locking rib. Fasteners 36 which may be rivets retain plates 30, 32 and member 34 together. For clarity pins 10 are not shown. However, it should be noted that pins 10 need be positioned before rib member 34 is inserted.

Two similarly formed sheet metal plates 38 and 40 are riveted or welded to opposite sides of a rib member 42 to form the intermediate member shown in Figure 3. Again the roller pins are not shown for clarity.

A more complex intermediate member structure is shown in Figure 4 wherein a block is drilled to provide roller pin positioning holes 44 and holes 46 for locking pins 48. A cross-sectional view through a locking pin position is shown in Figure 5 wherein locking pin 48 is shown engaging recess 22. An annular groove 50 receives an expansible arc ring 52 which cages locking pin 48.

In Figures 6 and 7 there is shown an intermediate member formed from a bar 60 having an internal bore 62 which serves as a keyway, rod 64, shown partly inserted, serves as a key to lock roller pins 10 in position.

The slide mechanisms of this invention may be universally mounted. That is they may be used with the roller pin positioned vertically as in Figure 1 or with the pins horizontal as in Figure 10 with the load either suspended or supported from the load member.

The roller pins may be readily inserted in the intermediate member and locked in position. This makes assembly of this device far simpler than one utilizing ball bearings.

Referring now to Figure 8 there is shown a resilient rubber shock mounting 70 affixed to mounting plate 72 which is provided with mounting holes 74. Fixed member 76 and load member 78 correspond to the members 2 and 4 of Figure 1. Rollers 80 are provided with pins 82 which are inserted through plates 84 and 86. After insertion the plates are maintained in a spaced relation by riveting or welding to reinforcing web 90.

In the embodiment of Figures 10, 11 and 12, there is provided a C shaped load member 102, a pair of spaced plates 104 and 106 bearing one row of rollers 108 and spacers 110 separated by spacers 116. Rollers 118 are retained by fixed members 112 and 114 which are welded to base member 115.

Figures 13 and 14 show a still different method of locking roller pins into the intermediate member. Web member 120 and flange members 122 and 124 are riveted together to form an I beam. This member could also be formed by extrusion techniques. Pins 10 are inserted into holes 124 and locked by means of strap 126 which is riveted or welded in place. A plurality of individual locking straps 128 may be substituted for strip 126.

There is disclosed in Figure 15 a mechanism for holding the slide rigid in the closed position. This prevents movement of the slides in a transverse direction which is a common disadvantage of prior art devices, particularly when used in equipment located in moving vehicles where the constant vibration results in excessive wear. Intermediate member 200 is provided with pins 202 and 204. As the slide is closed, one end (hidden in the view) of pin 202 engages angular block 206 while the end 204a engages angular face portion 208 which is a simple notch in the wall of the fixed member 210. The load member is provided with notch 212 and member 214 having angular faces which intersect and secure pins 202b and 204b.

A double pin arrangement is shown in Figure 16 wherein pins 216 and 218 intersect angular faces 220 and 222.

This stop mechanism serves the multiple functions of centering the intermediate member, reducing vibration and relieving the bearing member from load when not in the extended position.

The corners of the C channels should be beveled to permit easier entrance of the intermediate member. This is shown most clearly in Figure 1. The rollers may be faced with nylon or, where load bearing requirements permit, may be molded entirely of nylon.

While I have disclosed a number of embodiments of my invention it may be apreciated that other modifications and changes may be made without departing from the spirit of the invention, hence I desire to be limited only by the scope of the appended claims.

What I claim as new is:

1. A slide mechanism comprising a progressive member having a plurality of rollers provided with a reduced portion intermediate their ends, a substantially I-shaped member consisting of a web portion adapted to mate with said reduced portions and a pair of flange members affixed at substantially right angles to said web portion, said flanges being perforated to receive said rollers in two parallel rows so as to provide exposed bearing surfaces, a load member having a groove adapted to slidably receive one of said rows of rollers and a fixed member having a groove adapted to slidably receive the other of said rows and means to retain said rollers in said grooves.

2. A slide mechanism comprising a progressive member having a plurality of rollers provided with a reduced portion intermediate their ends, a substantially I-shaped member consisting of a web portion adapted to mate with said reduced portions and a pair of flange members affixed at substantially right angles to said web portion, said flanges being perforated to receive said rollers in two parallel rows, a load member providing a groove adapted to slidably receive one of said rows of rollers and a fixed member providing a groove adapted to slidably receive the other of said rows, said fixed and load members consisting of a strip having its longitudinal edges rebent to provide laterally directed flanges arranged at right angles thereto and inwardly directed flanges arranged parallel thereto wherein said last named flange form said grooves.

3. A slide mechanism comprising a progressive member formed of a pair of spaced elongated members having matching spaced perforations along the edges, a plurality of rollers provided with a reduced portion intermediate their ends rollably positioned in said perforations, a locking member fixed between said elongated members and adapted to mate with said reduced portion so as to lock said rollers into said perforations, a load member having a groove adapted to slidably receive one of said rows of rollers and a fixed member having a groove adapted to slidably receive the other of said rows.

4. A slide mechanism comprising a progressive member formed of a pair of spaced elongated members having matching spaced perforations along the edges, a plurality of rollers provided with a reduced portion intermediate their ends rollably positioned in said perforations, a locking member fixed between said elongated members and adapted to mate with said reduced portion so as to lock said rollers into said perforations, a load member providing a groove adapted to slidably receive one of said rows of rollers and a fixed member providing a groove adapted to slidably receive the other of said rows, said fixed and load members consisting of a strip having its longitudinal edges rebent to provide laterally directed flanges arranged at right angles thereto and inwardly directed flanges arranged parallel thereto wherein said last named flanges form said grooves.

5. A slide mechanism for attachment to a supporting member comprising a progressive member having a plurality of rollers provided with a reduced portion intermediate their ends, a substantially I-shaped member consisting of a web element adapted to mate with said reduced portions and a pair of flange members affixed to said web member, said flanges being perforated to receive said rollers in two parallel rows, a load member having a groove adapted to slidably receive one of said rows of rollers, a fixed member having a groove adapted to slidably receive the other of said rows, and a resilient material attached to said fixed member and adapted to be compressed between a supporting member and said fixed member.

6. A slide mechanism for attachment to a supporting member comprising a progressive member having a plurality of rollers provided with a reduced portion intermediate their ends, a substantially I-shaped member having a web provided with a portion adapted to mate with said reduced portions and a pair of flange members affixed to said web member, said flanges being perforated to receive said rollers in two parallel rows, a load member providing a groove adapted to slidably receive one of said rows of rollers, a fixed member providing a groove adapted to slidably receive the other of said rows, said fixed and load members consisting of a strip having its longitudinal edges rebent to provide laterally directed flanges arranged at right angles thereto and inwardly directed flanges arranged parallel thereto wherein said last named flanges form said grooves, and a resilient material attached to said fixed member and adapted to be compressed between a supporting member and said fixed member.

7. A progressive slide mechanism for attachment to a supporting member, comprising an intermediate member formed of a pair of elongated members having spaced perforations along the edges, a plurality of rollers provided with a reduced portion intermediate their ends rotatably positioned in said perforations, a locking member fixed between said elongated members and adapted to mate with said reduced portion so as to lock said rollers into said perforations, a load member having a groove adapted to slidably receive one of said rows of rollers and a fixed member having a groove adapted to slidably receive the other of said rows, and a resilient material attached to said fixed member adapted to be compressed between a supporting member and said fixed member.

8. A slide mechanism comprising a relatively long member of substantially rectangular cross-section perforated with two parallel rows of openings transversely positioned along the longitudinal edges of said member and a keyway intersecting said transverse holes, a plurality of rollers provided with a reduced portion intermediate their ends rotatably positioned in said openings so as to have an exposed bearing surface, a key member adapted to mate with said reduced portion positioned in said keyway, a load member having a groove adapted to slidably receive one of said rows of rollers and a fixed member having a groove adapted to slidably receive the other of said rows and means to retain said rollers in said grooves.

9. The slide mechanism of claim 8 wherein said key is provided with a circular cross-section.

10. A slide mechanism comprising a relatively long member of substantially rectangular cross-section perforated with two parallel rows of openings transversely positioned along the longitudinal edges of said member and a keyway intersecting said transverse holes, a plurality of rollers provided with a reduced portion intermediate their ends rotatably positioned in said openings so as to have an exposed bearing surface, a key member adapted to mate with said reduced portion positioned in said keyway, a load member providing a groove adapted to slidably receive one of said rows of rollers and a fixed member providing a groove adapted to slidably receive the other of said rows, said fixed and load members consisting of a strip having its longitudinal edges rebent to provide laterally directed flanges arranged at right angles thereto and inwardly directed flanges parallel thereto wherein said last named flanges form said grooves.

11. The slide mechanism of claim 10 wherein said key is provided with a circular cross-section.

12. A slide mechanism comprising an intermediate member having a longitudinal dimension substantially greater than its lateral dimensions and provided with a plurality of lateral channels of circular cross-section arranged in two longitudinal parallel rows and transverse openings extending from each said channel at substantially right angles, a plurality of rollers each provided with a reduced portion intermediate its ends, said rollers being rollably positioned in said channels, pins inserted in said openings adapted to mate with said reduced portions, means for positioning said pins in said openings, a load member having a groove adapted to slidably receive one of said rows of rollers and a fixed member having a groove adapted to slidably receive the other of said rows and means to retain said rollers in said grooves.

13. A slide mechanism comprising an intermediate member having a longitudinal dimension substantially greater than its lateral dimensions and provided with a plurality of lateral channels of circular cross-section arranged in two longitudinal parallel rows and transverse openings extending from each said channel at substantially right angles, a plurality of rollers provided with a reduced portion intermediate its ends, said rollers being rollably positioned in said channels, pins inserted in said openings adapted to mate with said reduced portions, means for positioning said pins in said openings, a load member providing a groove adapted to slidably receive one of said rows of rollers and a fixed member providing a groove adapted to slidably receive the other of said rows, said fixed and load members consisting of a strip having its longitudinal edges rebent to provide laterally directed flanges arranged at right angles thereto and inwardly directed flanges parallel thereto wherein said last named flanges form said grooves.

14. A progressive slide mechanism comprising an intermediate member having a plurality of rollers provided with a reduced portion intermediate their ends, a substantially "I" shaped member consisting of a web and a pair of flange members at right angles thereto, said flanges being perforated to rollably receive said rollers in two parallel rows, a pair of strip members adapted to mate with said reduced portion of each of said pair fastened to opposite sides of said web member so as to retain said rollers, a load member having a groove adapted to slidably receive one of said rows of rollers and a fixed member having a groove adapted to slidably receive the other of said rows.

15. A progressive slide mechanism comprising an intermediate member having a plurality of rollers provided with a reduced portion intermediate their ends, a substantially "I" shaped member consisting of a web and a pair of flange members affixed to said web member, said flanges being perforated to receive said rollers in two parallel rows having a portion of said rollers exposed, a pair of strips having formed loops adapted to rollably retain said rollers affixed to opposite sides of said web, a load member consisting of sheet metal formed into a substantially "C" shape thus providing a groove adapted to slidably receive one of said rows of rollers and a fixed member consisting of sheet metal formed into a substantially "C" shape thus providing a groove adapted to slidably receive the other of said rows.

16. A progressive slide mechanism comprising an intermediate member formed of a pair of elongated members having two rows of perforations arranged longitudinally, a plurality of rollers larger than said perforations provided with reduced end portions, rollably positioned in said perforations, spacing members fixed between said elongated members so as to rollably maintain said rollers between said elongated members, a load member providing a groove adapted to slidably receive one of said rows of rollers and a fixed member providing a groove adapted to slidably receive the other of said rows, said fixed and load members consisting of a strip having its longitudinal edges rebent to provide laterally directed flanges arranged at right angles thereto and inwardly directed flanges parallel thereto wherein said last named flanges form said grooves.

17. A progressive slide mechanism comprising a fixed member, a plurality of rollers having reduced end portions rotatably supported in fixed positions by said fixed member, an intermediate member comprising an elongated member having parallel spaced perforated members, a plurality of rollers having reduced end portions, said rollers being rollably retained by said perforated members with said reduced portions extending through said perforations, said perforated member having laterally extending portions at right angles thereto, extending portions parallel to said perforated portion, and inwardly extending portions forming a groove member adapted to slidably receive said fixed rollers and a load member consisting of a strip having its longitudinal edges rebent to provide laterally directed flanges arranged at right angles thereto and inwardly directed flanges parallel thereto so as to provide a load-bearing member adapted to slide upon the exposed portion of the said intermediate member rollers.

18. The mechanism of claim 17 wherein said intermediate member and said fixed members have rollers of unlike length.

19. A progressive slide mechanism for attachment to a supporting member, comprising an intermediate member formed of a pair of elongated members each having a first portion and bent at right angles thereto a second portion and a third portion having a perforated edge outwardly extending and parallel to said first portion, a plurality of rollers provided with a reduced portion intermediate their ends rollably positioned in said perforations, a locking member fixed between said first portions of said elongated members, and adapted to mate with said reduced portion so as to lock said rollers into said perforations, a load member having a groove adapted to slidably receive one of said rows of rollers and a fixed member having a groove adapted to slidably receive the other of said rows, and a resilient material compressed between said supporting member and said fixed member.

20. A slide mechanism comprising a member formed of a pair of spaced elongated members having matching spaced perforations along the edges, a plurality of rollers provided with a reduced portion intermediate their ends rollably positioned in said perforations, a locking member fixed between said elongated members and adapted to mate with said reduced portion so as to lock said rollers into said perforations, and a fixed member having a groove adapted to slidably receive the said row of rollers.

References Cited in the file of this patent

UNITED STATES PATENTS

| | | |
|---|---|---|
| Re. 23,461 | Gussack | Feb. 12, 1952 |
| 343,774 | Moore | June 15, 1886 |
| 1,301,495 | Otte | Apr. 22, 1919 |
| 1,898,273 | Stevens | Feb. 21, 1933 |
| 2,255,290 | Kennedy | Sept. 9, 1941 |
| 2,422,775 | Conner | June 24, 1947 |
| 2,564,658 | Jakeway | Aug. 21, 1951 |
| 2,678,865 | Perkins | May 18, 1954 |
| 2,687,924 | Gomersall | Aug. 31, 1954 |
| 2,719,310 | Stratton et al. | Oct. 4, 1955 |